United States Patent Office 2,852,392
Patented Sept. 16, 1958

2,852,392

PROCESS FOR IMPROVING THE TEXTURE AND HOMOGENEITY OF GROUND MEAT PRODUCTS AND COMPOSITION THEREFOR

Hans Huber and Kurt Vogt, Wiesbaden-Biebrich, Germany, assignors to Chemische Werke Albert, Wiesbaden-Kastel, Germany, a corporation of Germany No Drawing. Application February 5, 1954
Serial No. 408,588

Claims priority, application Germany June 20, 1951

10 Claims. (Cl. 99—108)

This invention relates to meat products, including sausages, having improved texture and homogeneity, and to processes for their production.

It has already been suggested that certain molecularly dehydrated phosphates have the property of preventing the quick coagulation of the blood of freshly killed animals. It has also been suggested that the color characteristics of pickled meats, which have been treated by nitrates or nitrites, can be improved by the addition of molecularly dehydrated phosphates other than alkali metal pyrophosphate.

In several prior copending applications filed on behalf of the present applicants and their associates, it is revealed that various combinations of phosphates can be used to advantage in improving the texture and homogeneity of ground meat products. Experience, further research and testing has brough out the fact that the various phosphates and polyphosphates do not act in the same way in meat products and that they are not equivalent in their effectiveness. The most satisfactory phosphate composition for the production of ground meat products has been determined to be a combination of sodium pyrophosphate together with a lesser quantity of a potassium "meta" phosphate, known as Kurrol's salt (a polymeric metaphosphate of the formula

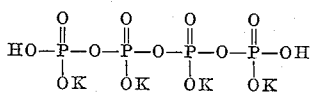

the condensation degree amounting to at least 1000.) This combination may be used effectively with the widest variety of meat products and compositions including meat loaves, meat pastes, pressed meats, canned meats and sausages. The normal pyrophosphate may be replaced in part by the acid sodium pyrophosphate if it is necessary or desirable to alter the pH value of the mixture.

In accordance with a special embodiment of the invention, as above mentioned combination of phosphates is incorporated in meat products in which a substantial amount of fat is desired and from which the fat would settle and separate upon heating during sterilizing or cooking. The meat products thus prepared remain homogeneous and are of high nutritive value. The fat in such products may be present as natural fat in the meat used or it may be specially added to lean meat to enhance its quality or improve its nutritive value. In such products the fat amounts to at least 30% of the meat mixture and may amount to as much as 60%, or somewhat more.

Less desirably, the potassium metaphosphate in the above described composition may be replaced with an equal amount of any alkali metal polyphosphate having less molecularly combined water than the pyrophosphate, as sodium metaphosphate or sodium tripolyphosphate. These salts also increase the fat-retaining properties of the meat products or constituents thereof.

The permissible range of ratios of the pyrophosphate to the second molecularly dehydrated phosphate in the combination reagent will naturally vary with the nature of the meat product, the age of the animal from which it is produced, the fat content and other factors but will ordinarily fall between 2:1 and 8:1.

A ratio of 4:1 will generally perform satisfactorily. When the combination of reagents is composed of a sodium salt with a potassium salt, the most universally effective proportion of the salts is that providing a ratio of about 4:1 of sodium ions to potassium ions. With this ratio, even sausage mixtures containing a high fat content and composed of a variety of meats can be converted into products of uniform fat distribution and of outstanding homogeneity. The ratio is especially effective in swelling the proteins such that tender products are obtained.

The relative quantities of sodium pyrophosphate and potassium metaphosphate or other polyphosphates introduced into the meat products will vary somewhat depending upon the nature of the meat product being treated and the nature of the product desired. For example, if the product is rich in fats or has a variety of ingredients in may require a greater addition of potassium metaphosphate than if the meat is quite lean or of substantially uniform properties. Likewise, if the meat is the type of meat which has a tendency to contract during cooking or other processing, it is necessary to include a greater amount of the mixed alkali phosphates than if the meat has a natural tendency to tenderize upon being cooked. Furthermore, the quantity of mixed phosphates will be determined in part by whether it is desired to produce a paste or pressed product, a hard or a soft product, a cured or a smoked product, or other alternative properties.

In accordance with a limited embodiment of the invention, a three component reagent is employed in which a minor part of the potassium metaphosphate is replaced with sodium tripolyphosphate preferably from 3% to 10%.

A final embodiment of the invention involves the use of alkali metal pyrophosphates in the absence of other phosphates. In non-fatty and low-fat meat compositions, normal sodium pyrophosphate alone is capable of providing much improved texture and homogeneity, particularly in uncured meat products or meats not requiring subsequent sterilization for canning or requiring cooking before being passed on to the consumer.

The amount of alkali pyrophosphate or total amount of molecularly dehydrated alkali metal phosphate mixtures introduced into the meat product should be sufficient to accomplish the desired improvement but insufficient to adversely affect the taste of the meat products and should preferably be of the order of 0.2 to 0.5% parts by weight based upon the quantity of meat products being treated. Somewhat smaller quantities may be used under special circumstances and at times as much as 0.6% parts by weight or more of the phosphates may be employed without materially impairing the taste of the meat products.

The treatment of meat products in accordance with this invention results in a number of unique and surprising effects upon the treated compositions. They impart a swelling or a tenderizing effect upon the meat albumens or proteins. The meat products have a much improved natural binding capacity thereby greatly improving the cutting properties of the products. For instance, it is possible to slice many treated compositions without having them crumble or fall apart, while untreated products could not be similarly sliced.

In addition, the treated meat products of this invention are outstanding in their uniformity and homogeneity. For example, sausages rich in fats with uniform characteristics can be prepared from a single meat or a variety of meats by mixing into the sausage mash or mixture the alkali phosphate compositions of the invention together with beef suet, tallow and the like, without causing undesirable local deposits of fat.

Apparently due to this homogenizing effect upon the treated meats, it is possible also to prepare meat products such as canned meats rich in fats capable of being heated to sterilizing temperatures over an extended period of time without a deleterious separation of the fats or without impairing the taste of the fats. Thus, in accordance with this invention, it is possible to provide very stable, sterilized meat products having outstanding uniformity and general palatability.

It is already known that various so-called stimulant acids, such as citric acid, tartaric acid, adipic acid, and the like, or salts thereof, can be advantageously added to various meat products such as those described herein. It has now been found that the presence of the mixture of phosphates of this invention enhances the value of these stimulant acids upon the meat products. It is well known that in the preparation of hard sausages, raw sausages, and similar known non-perishable products, dried glucose and dextrose, in solid forms or as syrup, can be used as binders. It has now been found that a small addition of the herein described alkali phosphates greatly enhances the value of such sugar-based binders, improving among other things the swelling effect upon the meat fibers and the slicing properties thereof. The amount of polymeric phosphates added to such hard or raw sausages is substantially smaller than the amount added to sausages which are to be broiled or cooked in water.

Yet another advantage of incorporating the mixture of the alkali metal pyro- and poly-phosphates resides in the prevention of the losses of spices, natural mineral salts, and meat juices during processing of the meat products, such as, cooking, pickling, smoking, and curing, or the like. If, for example, in the preparation of boiled ham, the bones are removed after curing and the respective areas separated from the bones sprinkled with these phosphates, and the ham then introduced into a can and heated in the conventional manner, extraordinary advantages are obtained in regard to preserving the meat juices within the body of the ham mass.

The invention is further exemplified by the following examples:

Example 1

A neutral reacting mixture of 0.175 weight part of tetrasodiumpyrophosphate with 0.075 weight part of potassium metaphosphate (Kurrol's salt) is added to 50 weight parts of a normal sausage mixture being prepared in the cutter. After the phosphate mixture has been stirred in, the meat is forced into casings which thereafter are smoked and scalded. The phosphate product prepared in this manner is superior to meats manufactured without the addition of the phosphates with respect to several qualities including homogeneity and cohesiveness upon cutting.

Example 2

Twenty-five hundredths weight part of a mixture composed of 18.5 parts of tetrapotassium pyrophosphate with 41.5 parts of acid sodium pyrophosphate and 40 parts of sodium tripolyphosphate are added to 50 weight parts of a sausage mixture being prepared in a cutter. After treatment such as described in Example 1 sausage products are obtained having qualities similar to those defined in said example.

Example 3

Fifty-nine hundredths kilo of a mixture composed of 4 parts of sodium pyrophosphate and 1 part of potassium metaphosphate is introduced into a sausage composition composed of 50 kilos of fresh meat, 40 kilos of fat, 4 kilos of potato flour and 24 liters of water. After thorough mixing, a sausage compostion is obtained in which the fat is uniformly distributed throughout the meat mass in stable condition. The final phosphate products may be readily supplied and consumed without crumbling or falling apart, for the cohesion of the mass is excellent.

Example 4

A mixture is prepared using 67.5 parts of normal sodium pyrophosphate, 10 parts of acid sodium pyrophosphate and 22.5 parts of tetrapotassium pyrophosphate. Lean as well as fatty meat compositions of good texture and homogeneity can be prepared using this mixture by adding from 0.1 to 0.25 weight part thereof to 50 weight parts of the meat composition. The fatty compositions should not be of a character requiring curing or heating to a temperature which will cause the fat to separate out.

Example 5

Five grams of a mixture consisting of 77% calcined tetrasodium pyrophosphate, 5% sodium tripolyphosphate, and 18% neutral potassium metaphosphate are added to a mixture of 350 grams beef meat, 350 grams pork meat and 300 grams smoked bacon, cut small. The mass is then mixed until a homogeneous sausage mass is obtained. The mass is filled into casings, boiled and smoked. Although a large amount of fat is included in the composition, it will remain uniformly distributed. Furthermore the sausage is of good quality as to its other properties.

This application is a continuation-in-part of co-pending application Serial No. 259,002, filed November 29, 1951, now abandoned.

It should be understood that the present invention is not limited to the specific materials or procedures hereinbefore described, but that it extends to all equivalents which will occur to those skilled in the art upon consideration of the scope of the claims appended hereto.

We claim:

1. A process for improving the texture and homogeneity of ground meat products which comprises incorporating in ground meat a small amount of a mixture of sodium pyrophosphate with a potassium polyphosphate having less molecularly combined water than pyrophosphate in a ratio between and about 2:1 and 8:1.

2. A process for improving the texture and homogeneity of ground meat products which comprises incorporating in ground meat a small amount of a mixture of sodium pyrophosphate with polymeric potassium metaphosphate in a ratio between and about 2:1 and 8:1.

3. A process for providing ground meat products of improved texture and homogeneity from ground meat masses containing fat in quantities having a tendency to separate out during heating which comprises mixing with such fat-containing meat mass a small quantity of a mixture of sodium pyrophosphate with a potassium polyphosphate having less molecularly combined water than the pyrophosphate in a ratio between about 2:1 and 8:1.

4. A process for providing ground meat products of improved texture and homogeneity from ground meat masses containing fat in quantities having a tendency to separate out during heating which comprises mixing with such fat-containing meat mass a small quantity of a mixture of sodium pyrophosphate with polymeric potassium metaphosphate in a ratio between about 2:1 and 8:1.

5. A process for improving the texture and homogeneity of ground meat products which comprises incorporating in ground meat a small amount of a mixture of (a) sodium pyrophosphate with (b) a mixture of polymeric potassium metaphosphate and about 3 to 10% as much sodium tripolyphosphate, said mixture of (a) and (b) being in a ratio between about 2:1 and 8:1.

6. A new composition of matter for improving the texture and homogeneity of ground meat products which comprises a mixture of sodium pyrophosphate with a potassium polyphosphate having less molecularly combined water than pyrophosphates in a ratio between about 2:1 and 8:1.

7. A new composition of matter for improving the texture and homogeneity of ground meat products which comprises a mixture of sodium pyrophosphate with polymeric potassium metaphosphate in a ratio between about 2:1 and 8:1.

8. A new composition of matter for improving the texture and homogeneity of ground meat products which comprises a mixture of (a) sodium pyrophosphate with (b) a mixture of polymeric potassium metaphosphate and about 3 to 10% as much sodium tripolyphosphate said mixture of (a) and (b) being in a ratio between about 2:1 and 8:1.

9. A new composition of matter for improving the texture and homogeneity of ground meat products which comprises a mixture of sodium pyrophosphate with polymeric potassium metaphosphate in a ratio of about 4 to 1.

10. A new composition of matter for improving the texture and homogeneity of ground meat products which comprises a mixture of sodium pyrophosphate, sodium acid pyrophosphate, and polymeric potassium polyphosphate having less molecularly combined water than the pyrophosphates, said sodium pyrophosphates and polymeric potassium polyphosphate being present in a ratio between about 2:1 and 8:1.

References Cited in the file of this patent

UNITED STATES PATENTS

| | | |
|---|---|---|
| 2,355,548 | Musher | Aug. 8, 1944 |
| 2,513,094 | Hall | June 27, 1950 |

FOREIGN PATENTS

| | | |
|---|---|---|
| 696,617 | Great Britain | Sept. 2, 1953 |

UNITED STATES PATENT OFFICE
CERTIFICATE OF CORRECTION

Patent No. 2,852,392

September 16, 1958

Hans Huber et al.

It is hereby certified that error appears in the printed specification of the above numbered patent requiring correction and that the said Letters Patent should read as corrected below.

Column 1, line 31, for "brough" read -- brought --; line 53, for "as above" read -- the above --; column 2, line 22, for "ingredients in" read -- ingredients it --; column 4, lines 42 and 47, after "between", each occurrence, strike out "and".

Signed and sealed this 3rd day of February 1959.

(SEAL)
Attest:

KARL H. AXLINE
Attesting Officer

ROBERT C. WATSON
Commissioner of Patents